(12) United States Patent  
Ward

(10) Patent No.: US 6,397,977 B1
(45) Date of Patent: Jun. 4, 2002

(54) VEHICLE BRAKE HAVING BRAKE DE-ADJUST

(75) Inventor: Andrew John Ward, Gwent (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/425,384

(22) Filed: Oct. 22, 1999

(30) Foreign Application Priority Data

Oct. 24, 1998 (GB) .............................................. 9823199

(51) Int. Cl.⁷ .............................................. F16D 66/00

(52) U.S. Cl. .............................. 188/1.11 L; 188/1.11 E; 188/73.33; 188/71.9; 188/72.8

(58) Field of Search ........................ 188/1.11 L, 1.11 E, 188/11.1 W, 1.11 R, 73.32, 73.33, 205 R, 206 R, 216, 71.9, 72.8

(56) References Cited

U.S. PATENT DOCUMENTS

| | | |
|---|---|---|
| 2,235,412 A | 3/1941 | Weiss |
| 3,684,049 A | 8/1972 | Kimura |
| 3,887,040 A * | 6/1975 | Simon et al. ........... 188/1.11 E |
| 4,175,646 A | 11/1979 | Eikelberger |
| 4,400,039 A | 8/1983 | Ogata |
| 4,677,420 A * | 6/1987 | Topic et al. ............. 188/1.11 E |
| 4,685,540 A * | 8/1987 | Rath et al. .............. 188/1.11 E |
| 4,804,073 A | 2/1989 | Taig |
| 4,809,824 A | 3/1989 | Fargier |
| 4,850,459 A | 7/1989 | Johaannesen |
| 4,995,483 A | 2/1991 | Moseley |
| 5,050,938 A | 9/1991 | Brearley |
| 5,127,495 A | 7/1992 | Verner |
| 5,148,894 A | 9/1992 | Eddy |
| 5,158,160 A | 10/1992 | Doell |

(List continued on next page.)

FOREIGN PATENT DOCUMENTS

| | | |
|---|---|---|
| DE | 4327759 | 3/1995 |
| DE | 19620344 | 8/1997 |
| DE | 19705105 | 8/1997 |
| DE | 19653541 | 6/1998 |
| DE | 19738877 | 9/1998 |
| EP | 0789156 A1 | 8/1997 |
| EP | 0995923 A2 | 10/1999 |
| EP | 0995657 A2 | 4/2000 |
| EP | 0995659 A1 | 4/2000 |
| EP | 0995922 A2 | 4/2000 |
| JP | 359086723 A | 5/1984 |
| JP | 359145659 | 8/1984 |
| JP | 108058 | 4/1992 |
| JP | 7257356 | 10/1995 |
| JP | 7277157 | 10/1995 |
| JP | 8-127317 | 5/1996 |
| JP | 9221010 | 8/1997 |
| JP | 10024813 | 1/1998 |
| WO | WO 97/29292 | 8/1997 |
| WO | WO 97/29297 | 8/1997 |
| WO | WO 97/29298 | 8/1997 |
| WO | WO 99/38738 | 8/1999 |
| WO | WO 99/48738 | 9/1999 |

*Primary Examiner*—Paul N. Dickson
*Assistant Examiner*—Devon Kramer
(74) *Attorney, Agent, or Firm*—Carlson, Gaskey & Olds

(57) ABSTRACT

A vehicle brake of the caliper type having electrically actuated active adjustment of the running clearance of a brake lining relative to a brake rotor, wherein, for brake operation, angular displacement of a rotatable component (14) of the brake by an external actuator causes axial displacement of a tappet arrangement (22, 24) within the brake whereby to transmit the actuator input load to the brake lining of the brake. The brake includes a switch for supplying a brake de-adjust signal when the brakes are to be opened for example for lining replacement. The switch is mounted on or in the body of the brake caliper and provides a non-contact switch arrangement actuated by a rotary movement provided by the rotatable component (14) of the brake in response to lining wear.

19 Claims, 7 Drawing Sheets

U.S. PATENT DOCUMENTS

| | | | |
|---|---|---|---|
| 5,161,650 A | 11/1992 | Taig | |
| 5,310,251 A | 5/1994 | Towers | |
| 5,325,949 A | * 7/1994 | Dommett et al. | 192/70.25 |
| 5,348,123 A | 9/1994 | Takahashi | |
| 5,370,449 A | 12/1994 | Edelen | |
| 5,410,293 A | * 4/1995 | Angerfors | 188/1.11 E |
| 5,775,448 A | 7/1998 | Hirahara | |
| 5,788,023 A | 8/1998 | Schoner | |
| 5,807,205 A | 9/1998 | Odaka | |
| 5,848,672 A | * 12/1998 | Brearley et al. | 188/1.11 L |
| 5,949,168 A | 9/1999 | Dieckmann | |
| 5,954,162 A | 9/1999 | Feigel | |
| 5,957,246 A | 9/1999 | Suzuki | |
| 5,975,250 A | * 11/1999 | Brandmeier et al. | 188/1.11 W |
| 5,988,773 A | * 11/1999 | Sawada | 188/1.11 E |
| 6,000,507 A | * 12/1999 | Bohm et al. | 188/158 |
| 6,003,640 A | * 12/1999 | Ralea | 188/71.5 |
| 6,012,556 A | 1/2000 | Blosch | |
| 6,016,694 A | 1/2000 | Decker | |
| 6,129,183 A | * 10/2000 | Ward | 188/1.11 L |
| 6,139,117 A | 10/2000 | Shirai | |
| 6,186,291 B1 | * 2/2001 | Barnard | 188/170 |

* cited by examiner

APPLY

RELEASE

VEHICLE BRAKE HAVING BRAKE DE-ADJUST

RELATED APPLICATION

This application claims priority to U.K. application number 9823199.6 filed on Oct. 24, 1998.

BACKGROUND OF THE INVENTION

1. Field of the Invention

The present invention is concerned with the provision of a switch to control the de-adjustment of a vehicle brake when a service operation is required, such as to replace worn pads.

2. Description of the Related Art

It is already well known to provide an electric motor to control the running clearance of braking linings relative to a brake rotor based upon signals from sensors monitoring the clearance take-up movement and brake actuation stroke. The known systems tend to mimic the mechanical operation of a conventional brake clearance control device known as an "automatic adjuster". In such adjusters, a clutch having some degree of lost motion is provided where the level of free motion is equivalent to the maximum allowable running clearance. Should the brake linings wear such that the running clearance is greater than this maximum allowable clearance, upon operation of the brake, the free running clearance is "taken-up" and the further additional movement, caused by the excess lining clearance causes the clutch to slip. The slipping motion has the effect of moving the backstop or datum position for the return of the brake lining, thus progressively advancing the lining towards the brake rotor as the brake lining wears. Such mechanical automatic adjusters are well known in the art.

In a brake of the kind with which the switch of the present invention is concerned, it is important to reduce weight, power consumption (whether electrical or pneumatic) and material costs. In a conventional brake, having an automatic adjuster of the mechanical kind or even an electric adjuster that mimics the mechanical operation, the strength of the mechanisms associated with the adjuster has to be extremely high. The reason for this is that the actual brake adjustment takes place only during the brakes-on phase of a brake application. The adjuster mechanism moves only when brake torque is being applied and therefore the adjuster drive train has to be capable of driving through this locked in torque.

We have proposed in another Application filed concurrently herewith that in a brake adapted to apply a brake lining to a brake rotor, there is provided a clearance control device for actively maintaining the free running clearance between the brake lining and the brake rotor during the non-braking phase, wherein the adjustment of the brake lining position relative to the brake rotor only takes place during the brakes-off condition.

The advantage of only adjusting the position of the brake lining in the brakes-off condition is that the locked-in brake torque that has to be overcome before adjustment of the conventional kind can take place has now been eliminated.

Therefore in such a brake the torque required to move the brake linings into the new datum position, when the brakes are not applied, is substantially reduced, and likewise, the torque being carried by the adjustment mechanism is also reduced.

With the reduction in torque required to perform the adjustment, it is now possible to redesign the adjuster drive train so that it is substantially smaller and lighter without compromising the performance of the adjustment mechanism.

In such a situation, it is now possible to design and implement an adjuster mechanism that is substantially formed from a light weight plastics material, which enables the overall weight of the brake assembly to be drastically reduced.

The electric motor can be housed within the brake, thus protecting it and it's associated drive from any ingress of contaminants.

The invention is particularly applicable to brakes of the type wherein angular displacement of a rotary member, referred to commonly as the op-shaft, by an external actuator causes axial displacement of a pair of laterally spaced tappets, by way of rollers running on cam surfaces of the rotary member, the displacement of the tappets transmitting the actuator input load to a brake lining of the brake.

The electric motor can be located in the portion of the brake between the tappets, in a portion of the brake that conventionally was occupied by a mechanical adjuster. In such a position, the motor and it's drive are in close association with the mechanism for applying the brake.

In order to reduce the electric power consumption to a low level, the electric motor employed can be a high-speed low power/torque motor, operated in use in combination with a reduction gearbox.

The reduction gearbox can be of a compact design such as a compound epicyclical or multi-stage planetary gearbox. Alternative designs such as worm and wheel or cycloidal or any combination thereof are also suitable.

In order to provide the adjustment data required to perform the adjustment operation, a sensor or sensors is/are provided to generate information about the movement of the brake. In particular, the free running stroke of the brake, i.e. the clearance take-up movement, needs to be assessed. The stroke of the brake actuator can be measured by a displacement sensor, but the portion of that travel that is equivalent to the free running travel can only be determined by assessment of the displacement in combination with knowing the load being applied. As the brake lining moves, under normal actuation, the load being applied during the free running or clearance take-up movement is low. As soon as the brake linings engage the brake rotor, the load required to move any distance further is substantially increased. It can therefore be seen that by comparison of brake lining displacement and applied load, the free running clearance of the brake lining with respect to the brake rotor can be determined.

Therefore, a sensing means can be provided which is adapted to determine both the displacement of the brake and the load applied by the brake and a means to compare the output of the sensing means so as to determine the free running clearance of the brake.

The free running clearance of the brake can then be maintained within a desired range, through use of an electric drive within the brake adapted to adjust the datum position of the brake linings.

A sensor within the brake provides brake lining position information that can be used to control the motor in positioning the brake linings in correct accordance with the prescribed limits.

The sensor can also be used to provide a signal that indicates the actual wear state of the brake linings and may take the form of an encoder, either linear or rotary, that is driven from a part of the brake that moves upon adjustment of the brake, said encoder signals being accumulated in a non-volatile memory for use in an adjustment operation.

In a brake having an electric motor adapted to perform the adjustment operation, de-adjustment can also be enabled automatically through use of the same motor. De-adjustment is required when it has been determined that the brake linings require replacement. In a conventional brake, the adjuster mechanism has to be manually unwound so as to retract the brake applying piston away from the brake rotor. This enables the old linings to be removed and replaced with new linings. When an electric motor is used, a simple electrical signal from a brake associated switch, either mounted on the brake or electrically connected thereto, can be used to instigate the retraction of the brake applying member. It is with such a switch that the present invention is concerned.

BRIEF SUMMARY OF THE INVENTION

In accordance with the present invention in its broadest aspect, there is provided a switch to supply a de-adjust signal to a brake of the kind having electrically actuated adjustment, the switch being adapted to be mounted on or in the body of a caliper of the brake and to provide a non-contact switch arrangement actuated by a rotary movement provided by a rotatable component of the brake in response to lining wear.

In accordance with a second aspect of the invention, there is provided a vehicle brake of the caliper type having electrically actuated adjustment of the running clearance of a brake lining relative to a brake rotor, wherein, for brake operation, angular displacement of a rotatable component of the brake by an external actuator causes axial displacement of a tappet arrangement within the brake whereby to transmit the actuator input load to the brake lining of the brake, and wherein a switch is provided to supply a brake de-adjust signal, characterised in that the switch is adapted to be mounted on or in the body of the brake caliper and to provide a non-contact switch arrangement actuated by a rotary movement provided by said rotatable component of the brake in response to lining wear.

Preferably, the switch comprises two relatively rotatable components which carry respective parts of a two-part, non-contact type switch arrangement.

In one advantageous embodiment, one component carries a magnet and the other carries a Hall-effect sensor.

In a preferred embodiment, the two relatively rotatable components comprise a base frame, carrying the Hall-effect sensor, and an upper cover carrying the magnet, the frame and cover being assembled through a boss on or coupled to the caliper housing such that the cover can be selectively rotated about the frame.

In a particularly preferred embodiment, the cover turns on the frame such as to provide both rotational and linear movement therebetween. This can be achieved by providing a lead screw between these components.

Advantageously, the magnet and sensor are both disposed off-axis on the relatively rotatable components, with the magnet being substantially 180 degrees opposed to the sensor in a rest/start position and wherein relative rotary movement by an amount at which a signal is to be generated brings the magnet and sensor into alignment.

BRIEF DESCRIPTION OF THE INVENTION

The invention is described further hereinafter, by way of example only, with reference to the accompanying drawings, in which.

Figure 3A:
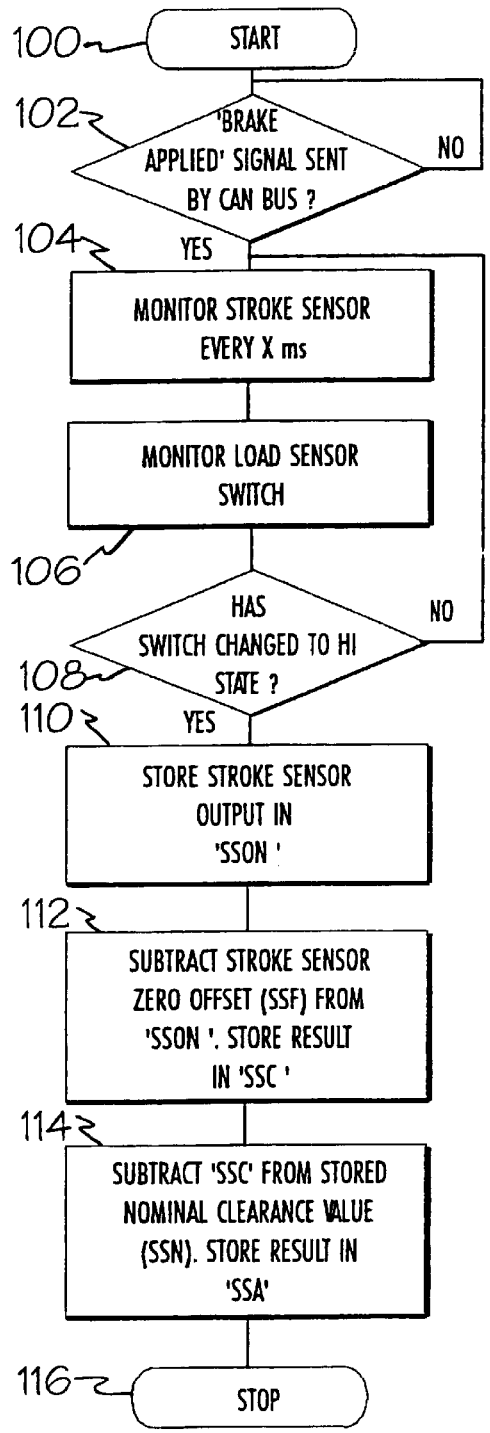
Figure 3B:
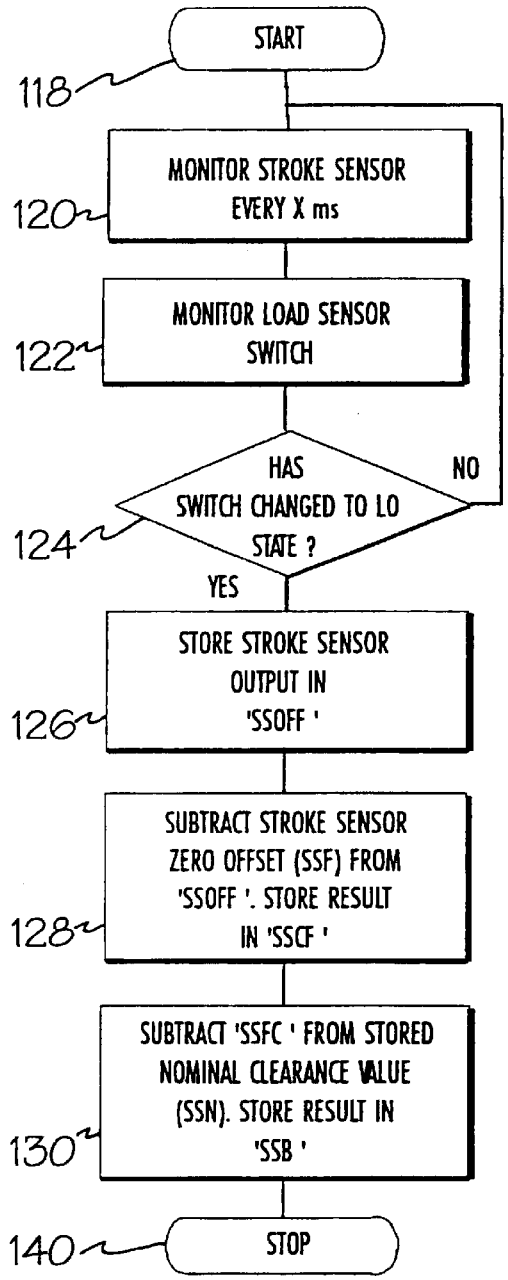
Figure 4:
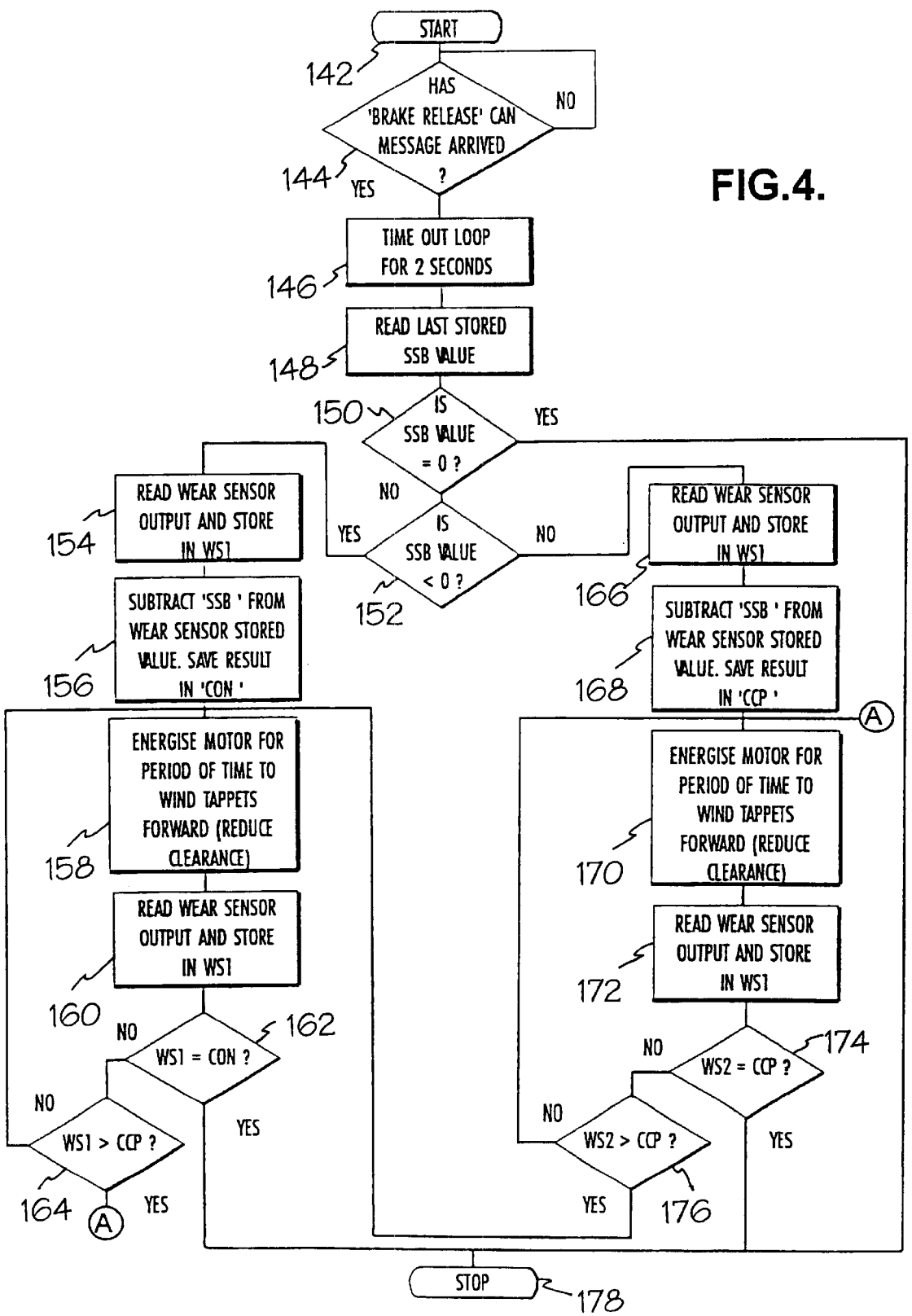
Figure 5:
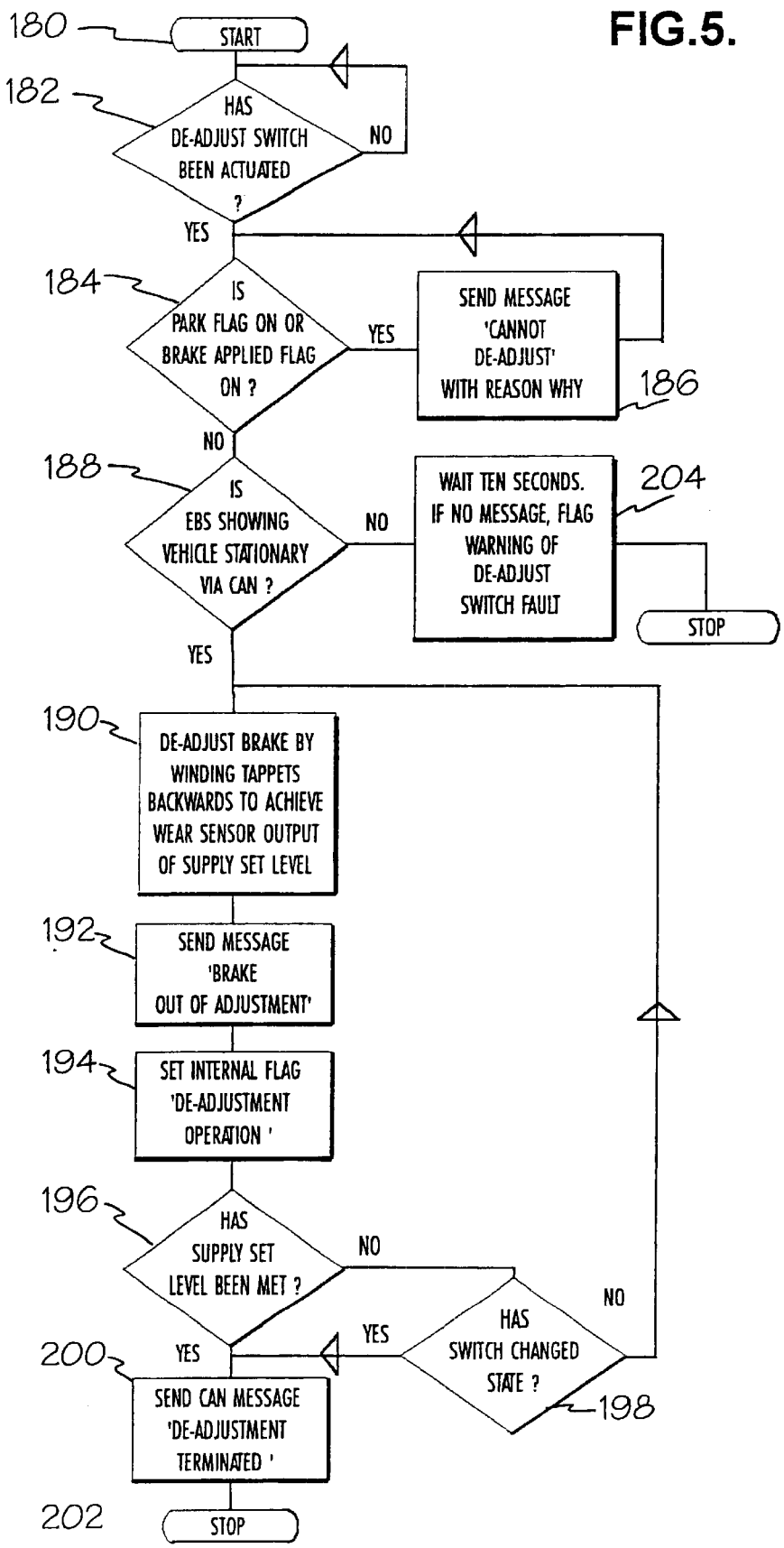
Figure 6:
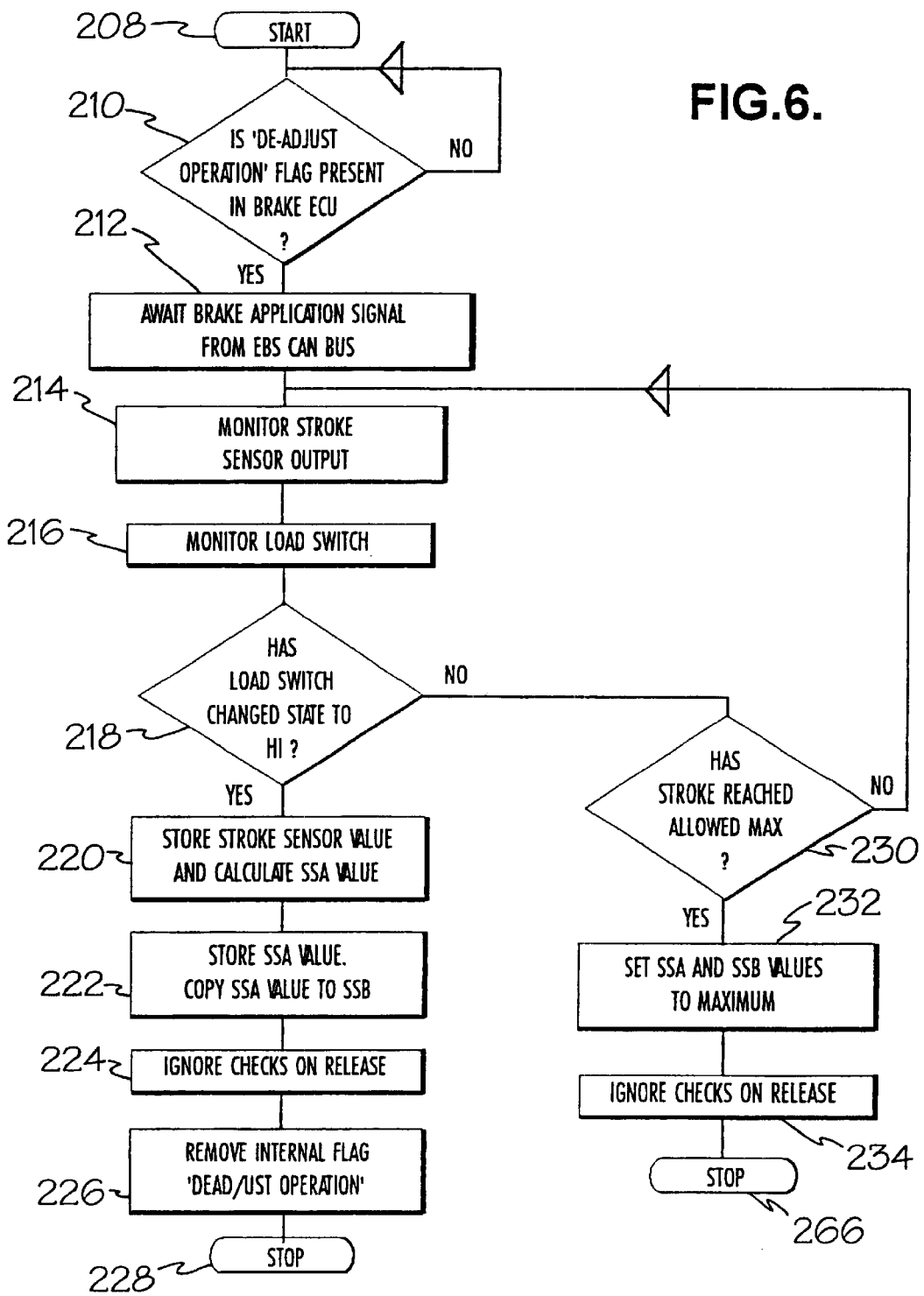
Figure 7:
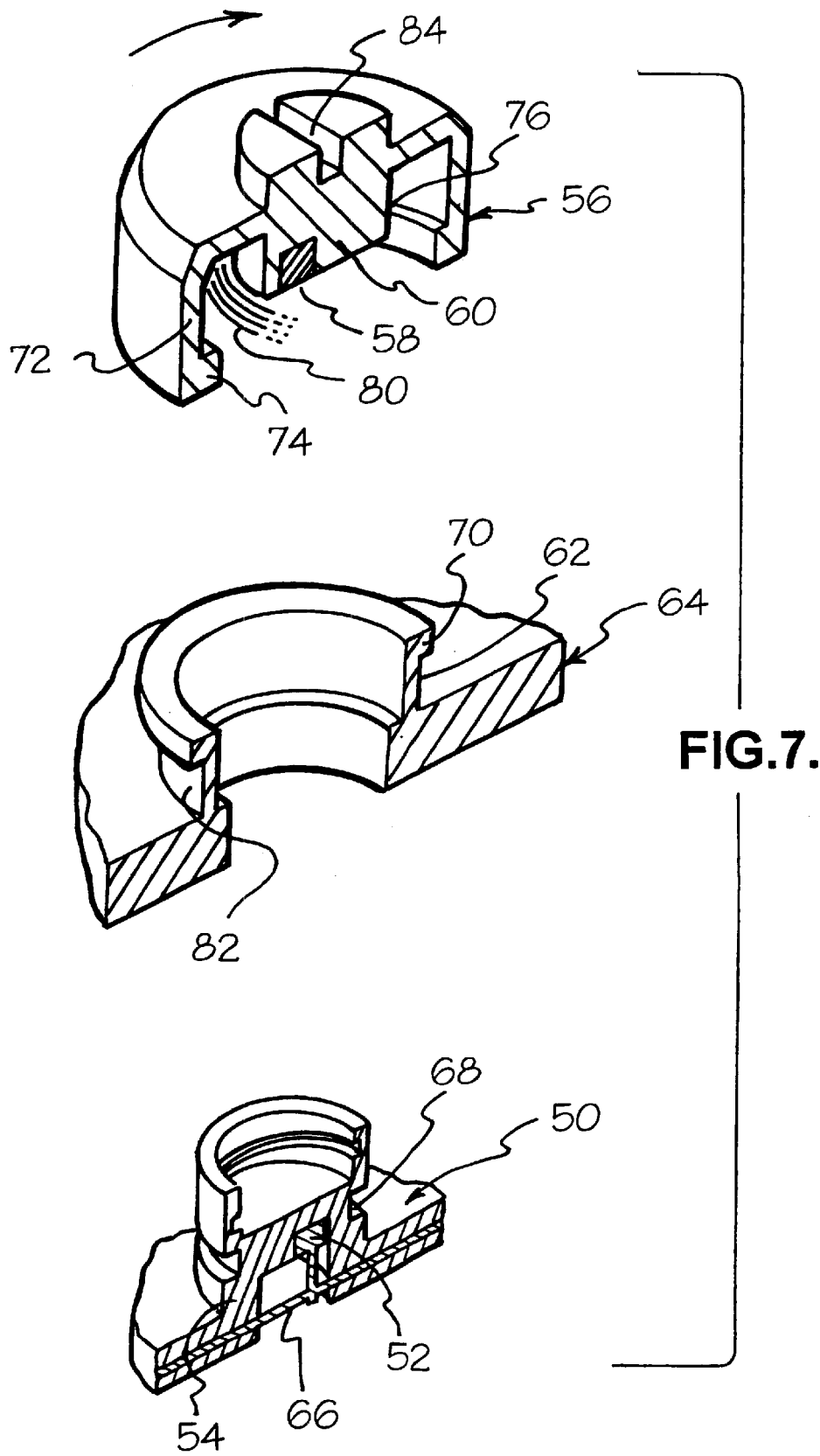

FIGS. 3a and 3b comprise flow charts showing how measurements are made;

FIG. 4 is a flowchart showing the clearance adjustment sequence;

FIG. 5 is a flowchart showing the initiation of de-adjustment;

FIG. 6 is a flowchart showing the readjustment of a brake that has been reset; and FIG. 7 is an exploded sectional view of one embodiment of a brake de-adjust switch in accordance with the present invention.

DETAILED DESCRIPTION OF THE INVENTION

Figure 1:
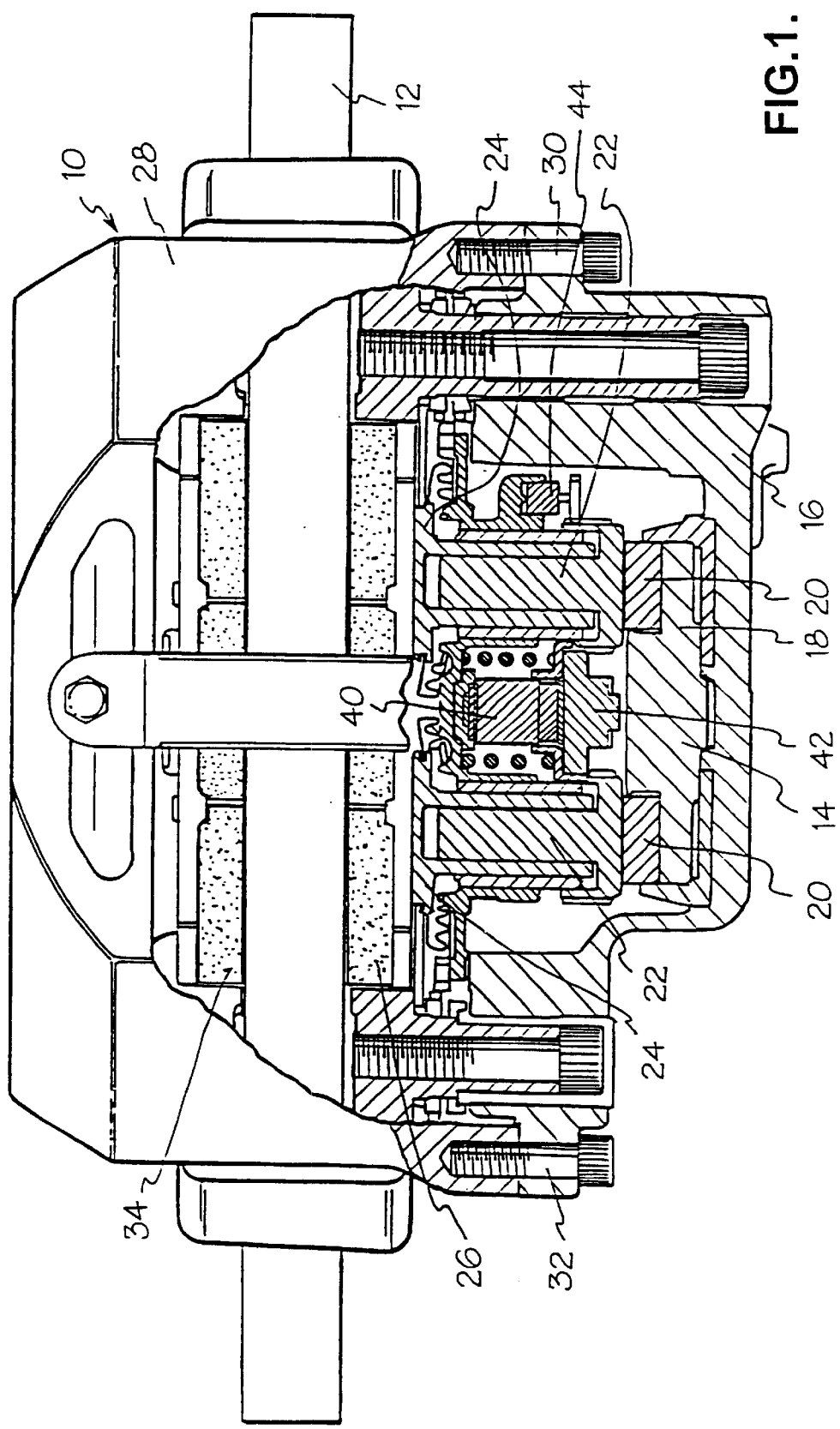
FIG. 1 is a partially sectioned plan view of one embodiment of a brake to which the motor de-adjust switch of the present invention can be applied.

The brake of FIG. 1 is of the type comprising a caliper housing 10 that straddles a disc 12 mounted on an axle of the vehicle to be braked (not in shown). The brake is actuated by mechanical movement of an input actuator such as an air cylinder (not shown). Such actuators are well known in the field of brake actuation. The actuator co-operates with the outer end of the operating shaft or 'op-shaft' 14 of the brake. The inner end of the op-shaft 14 is carried in a bearing attached to the lower or inner housing part 16. Said inner end of the op-shaft 14 has formed on its outer surface a cam lobe 18 which, upon rotation, causes a reaction force to be transmitted to rollers 20. The rollers 20 in turn transmit the applied load to a pair of spaced inner tappet members 22. These inner tappet members 22 are screwed into engagement with associated outer tappet members 24 which apply the input load from the actuator to the rear of the inner braking lining 26, thus pressing the friction material of the inner braking lining 26 into frictional engagement with the disc 12. A reaction force is generated through this frictional engagement between the disc 12 and inner braking lining 26, that is fed back through the tappets 22 and 24, rollers 20 and cam lobe 18 which is supported by the inner housing part 16. The inner housing part 16 is secured to an outer housing part 28 by bridging bolts 30 and 32. Thus the applied force being generated by movement of the op-shaft 14 is ultimately transmitted by reaction means to the outer housing part 28 which in turn presses the outer brake lining 34 into frictional engagement with the disc 12. Therefore, the disc 12, upon movement of the op-shaft 14, is clamped between the inner and outer friction linings 26 and 34 to generate a braking force for braking the vehicle under control of the applied input movement.

As shown in FIG. 1, the brake also includes an electric motor 40 adapted to drive via a reduction gearbox 42, shown here by way of example as a multi-stage planetary gearbox, a part of the telescopic tappet assembly that, upon rotation, acts to increase or reduce the overall length of the tappet assembly in accordance with the direction of rotation of the motor. Such extension or contraction adjusts the rest position of the brake applying member and therefore the clearance available between the brake linings and the brake rotor/disc.

Also shown is a rotary encoder 44 that is driven from a part of the tappet assembly that moves upon adjustment. The encoder produces a signal which is arranged to be processed in an ECU where it's output is accumulated to provide a measure of the total position and therefore total movement of the adjustment mechanism, this output being proportional to the actual wear condition of the brake linings.

Figure 2:
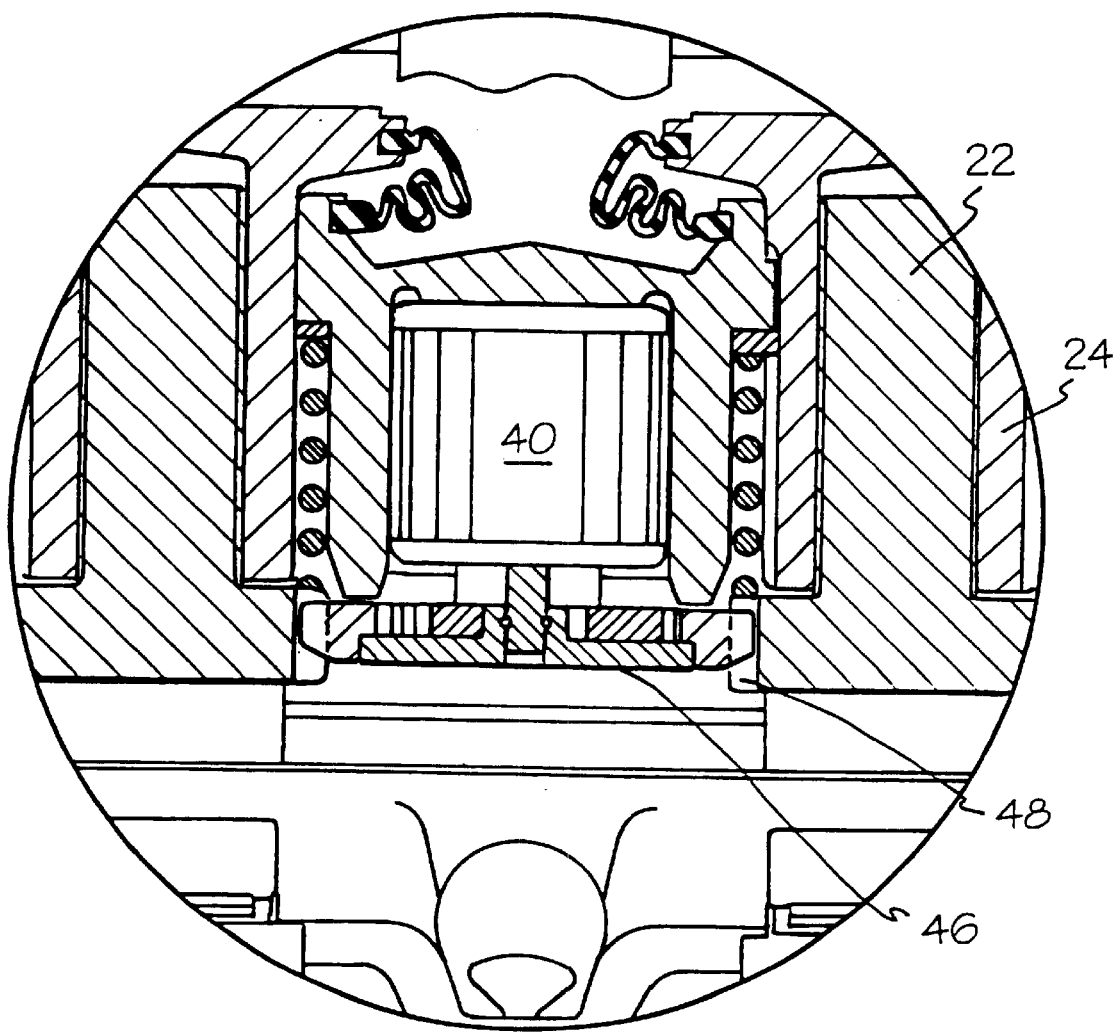
FIG. 2 is an enlarged detail of FIG. 1 showing a motor and gearbox installation.

In operation, once it has been determined that the brakes have been released, the clearance data obtained is used by the ECU to determine whether an adjustment of the clearance is required. If such an adjustment is required then the motor 40 is driven to the new position. As can be seen from FIG. 2, the motor output drives through a cycloid gearbox assembly 46 onto a gear form 48 associated with the inner tappet member 22. The inner tappet member 22 is threadedly engaged with the outer tappet member 24 which is held against rotation. Rotation of the inner tappet member causes the overall tappet assembly to either extend or contract. It should be appreciated that the torque required to drive the tappet assembly to produce the aforementioned effect is substantially lower when the tappet assembly is not under any substantial axial loading as the friction level is drastically reduced between the two threaded members. In view of the fact that the torque required to produce the adjustment movement is substantially small with respect to that had the brakes been applied, the gearbox and tappet drives can now be produced from a material that is substantially lighter.

Reference is now made to the flowcharts of FIGS. 3*a* and 3*b* which show respectively examples of the sequence of steps during a brake application and brake release. The individual steps in FIGS. 3*a* and 3*b* are as follows:
100—Start
102—Brake Applied signal sent by CAN bus?
104—Monitor stroke sensor every X ms
106—Monitor load sensor switch
108—Has switch changed to HI state?
110—Store stroke sensor input in SSON
112—Subtract stroke sensor zero offset (SSF) from SSON. Store result in SSC
114—Subtract SSC from stored nominal clearance value (SSN). Store result in SSA
116—Stop
118—Start
120—Monitor stroke sensor every X ms
122—Monitor load switch
124—Has switch changed to LO state?
126—Store stroke sensor output in SSOFF
128—Subtract stroke sensor zero offset (SSF) from SSOFF. Store result in SSCF
130—Subtract SSCF from stored nominal clearance value (SSN). Store result in SSB
140—Stop.

In accordance with the flowchart of FIG. 3*a*, the brake application is monitored through sensing the stroke of the brake. Stroke can be measured, for example, using a linear displacement sensor coupled to the input end of the op-shaft 14. When the brake linings 26, 34 make frictional engagement with the brake rotor 12, the load transmitted by the brake actuator to the brake is sensed and detected. This can be achieved using a sensor disposed at the input end of the op-shaft.

For example, such a load sensor can be in the form of a Hall effect sensor wherein the load applied by an actuation rod (for example from art air cylinder) reacts against a Belleville washer which is sandwiched between the actuation rod and a collar acting against an arcuate surface of the outer end of the op-shaft. The collar also locates a magnet portion of the sensor, a detector part of the sensor being located within the op-shaft, adjacent said arcuate surface. The Belleville washer enables a small movement of the magnet relative to the detector dependent on load, this movement being detected by the Hall effect to provide a proportional signal representative of load level.

Another form of load cell can be in the form of a linear displacement sensor for proportional load measurement. An actuation rod reacts against a Belleville washer to provide proportional load movement of an axially extending soft iron finger, the finger 148 extending into a coil to detect linear displacement.

The actual stroke or displacement of the brake is recorded and checked to see if it has (a) changed any prescribed amount from an earlier application or (b) changed by any amount that exceeds a prescribed clearance threshold. Upon release of the brake, the preceding routine is repeated as the brake load is released (See FIG. 3*b*). The results for the actual clearance measured are stored and if outside prescribed thresholds the brake is then adjusted in accordance with the procedure outlined in the flowchart of FIG. 4, the individual steps of which are as follows:
142—Start
144—Has brake release CAN message arrived?
146—Time out loop for 1 seconds
148—Read last stored SSB value
150—Is SSB value=0?
152—Is SSB value <0?
154—Read wear sensor output and store in WSI
156—Subtract SSB from rear sensor stored value. Save result in CON
158—Energise motor for period of time to wind tappets forward (reduce clearance)
160—Read wear sensor output and store in WSI
162—WSI=CON?
164—WSI>CON?
166—Read wear sensor output and store in WSI
168—Subtract SSB from wear sensor stored value. Save result in CCP
170—Energise motor for period of time to wind tappets back (increase clearance)
172—Read wear sensor output and store in WSI
174—WSI=CCP?
176—WSI <CCP?
178—Stop.

Brake adjustment is achieved in accordance with the operation as outlined in FIG. 4. Upon detection that the brake has been released, and detection that the stored clearance value is outside the prescribed adjustment threshold, the motor 40 is energised either to decrease the brake free running clearance or to increase the brake free running clearance by rotation of the tappet member 22 in the appropriate direction. The output from the tappet driven wear-out sensor or encoder 44 is recorded or accumulated to provide a signal indicative of the worn condition of the brake linings.

Should the signal from the wear-out sensor 44 determine that a lining change is required, then an alarm or other indication could then be issued. De-adjustment of the brake or retraction of the brake applying members is then instigated through use of an electrical or electronic switch that, once operated, acts in accordance with the principles shown in the flowchart of FIG. 5. Once activated, the system determines whether the vehicle is in a correct condition to allow the brake to be 'opened' i.e. stationary. If this condition is satisfied then the electric motor 40 is energised so as to cause the brake-applying members to retract from the brake rotor 12. As the brake is no longer in correct adjustment, a flag is set so as to indicate to a controller than an adjustment is required.

After re-assembly of the brake, the out-of-adjustment flat is recognised and the brake is rapidly re-adjusted with the operation of flowchart of FIG. 6.

The individual steps in the flowcharts of FIGS. 5 and 6 are as follows:
180—Start
182—Has de-adjust switch been actuated?
184—Is park flag on or brake applied flag on?
186—Send message cannot de-adjust with reason why
188—Is EBS showing vehicle stationary via CAN
190—De-adjust brake by winding tappets backwards to achieve wear sensor output of supply set level
192—Send message brake out of adjustment
194—Set internal flag de-adjustment operation
196—Has supply set level been met?
198—Has switch changed state?
200—Send CAN message de-adjustment terminated
202—Stop
204—Wait 10 seconds. If no message, flag warning of de-adjust switch fault
206—Stop
208—Start
210—Is de-adjust operation flag present in brake ECU?
212—Await brake application signal from EBS CAN bus
214—Monitor stroke sensor output
216—Monitor load switch
218—Has load switch changed state to HI?
220—Store stroke sensor value and calculate SSA value
222—Store SSA value, copy SSA value to SSB
224—Ignore checks on release
226—Remove internal flat de-adjust operation
228—Stop
230—Has stroke reached allowed max?
232—Set SSA and SSB values to maximum
234—Ignore checks on release
236—Stop.

FIG. 7 shows one embodiment of a special switch in accordance with the present invention for instigating the de-adjustment of the brake wherein the brake applying members are arranged to be retracted for service operations, for example to enable the old linings to be removed and replaced with new linings.

The de-adjust switch of FIG. 7 is mounted in use at a suitable position on the caliper body to provide a non-contact switch arrangement, such as a magnetic switch, actuated by rotary movement. The switch is to be capable of being turned on a threaded member to provide both rotational and linear movement. Preferably, the switch mechanism is substantially sealed from the surrounding environment.

As shown in FIG. 7, this embodiment of the switch comprises a lower lead frame 50 carrying therewith a Hall-effect sensor 52 which is mounted off-axis in an upwardly extending, generally cylindrical body 54, and an upper cover 56 carrying a magnet 58 which is mounted off-axis in a depending cylindrical stub 60. The upper and lower parts 50, 56 are assembled together by means of a raised boss section 62 on the brake caliper housing 64.

The lower lead frame switch part 50 includes a membrane 66 to seal the sensor 52 from the ingress of dirt and is attached to the underside of the caliper body in a convenient manner. An O-ring (not shown) is located in an undercut 68 in the body 54 to additionally seal the switch from the undesirable ingress of contaminates.

The caliper housing boss section 62 has a peripheral lip 70. The upper cover 56 has a skirt portion 72 with an inward peripheral lip 74 and is located over the caliper boss section 62 and retained thereon by engagement of the lip 74 under the boss lip 70. The cap portion 56 can be made of a flexible plastics material or may have a split skirt 72 to enable it to be assembled over the boss portion 62. The magnet 58 can be moulded in place within the central stub 60 of the upper cover 56. In the assembled rest position, the magnet is arranged to lie 180 degrees opposed to the sensor 52 in the lower switch part. Thus, the switch is off in this condition. Rotary movement of the switch to rotate the upper cover 56 relative to the lower lead frame 50 will eventually line up the magnet vertically above the sensor to generate a Hall-effect signal in the sensor.

In this embodiment, the cap has a fast screw thread 76 on the stub 60 which co-operates with a thread 78 within the switch body 54 to provide rotary and axial movement of the cap. This arrangement provides an improved actuation of the sensor over simple rotary movement as the screw axial movement creates a larger air gap between the sensor 52 and the magnet 58 in the rest (switch-off) position.

The assembly can have a spring (shown partially at 80) located in the recess 82 of the caliper-housing boss 62 and around the cap stub 60. The spring 80 would be restricted against movement by tabs (not shown) located in the caliper and cap. When the cap is rotated the spring would tension and provide an automatic return feature when the cap is released.

The components 50, 56 of the abovedescribed switch can be made of lightweight plastics materials.

In use, the switch is mounted within the brake, for example corresponding to the encoder 44 in FIG. 1, so that the cover part 56 can be driven by engagement with a suitable rotary driving member 57 drivingly coupled with one of the inner tappets 22. The cover 56 has a diametrical slot 84 for this purpose.

What is claimed is:

1. A switch for supplying a de-adjust signal to a brake of the kind having electrically actuated adjustment, the switch being adapted to be mounted on or in a caliper body of the brake and to provide a non-contact switch arrangement actuated by a rotary movement provided by a rotatable component of the brake in response to lining wear.

2. A vehicle brake as claimed in claim 1, wherein the switch comprises two relatively rotatable components (50, 56) which carry respective parts of a two-part, non-contact type switch arrangement.

3. A vehicle brake as claimed in claim 2 wherein one component (56) carries a magnet (58) and the other component (50) carries a Hall-effect sensor (52).

4. A vehicle brake as claimed in claim 3 wherein the two relatively rotatable components comprise a base frame (50), carrying the Hall-effect sensor (52), and an upper cover (56) carrying the magnet (58), the frame (50) and cover (56) being assembled through a boss (62) on or coupled to die caliper body such that the cover (56) can be selectively rotated about the frame (50).

5. A vehicle brake as claimed in claim 4 wherein the cover (56) is arranged to turn on the frame (50) such as to provide both rotational and linear movement therebetween.

6. A vehicle brake as claimed in claim 3, wherein the magnet (58) and sensor (52) are both disposed off-axis on the relatively rotatable components (50, 56), with the magnet (58) being substantially 180 degrees opposed to the sensor (52) in a rest/start position and wherein relative rotary movement by an amount at which a signal is to be generated brings the magnet (58) and sensor (52) into alignment.

7. A vehicle brake as claimed in claim 1 wherein the de-adjust signal is communicated to an actuation mechanism for retracting a friction lining away from a rotating braking surface once a predetermined minimum friction lining thickness has been achieved to allow friction lining replacement.

8. A vehicle brake of the caliper type having electrically actuated adjustment of running clearance of a brake lining relative to a brake rotor, wherein, for brake operation, angular displacement of a rotatable component (14) of the brake by an external actuator causes axial displacement of a tappet arrangement (22, 24) within the brake whereby to transmit an actuator input load to the brake lining of the brake, and wherein a switch is provided to supply a brake de-adjust signal, characterised in that the switch is adapted to be mounted on or in a brake caliper body and to provide a non-contact switch arrangement actuated by a rotary movement provided by said rotatable component of the brake in response to lining wear.

9. A vehicle brake as claimed in claim 8, wherein the switch comprises two relatively rotatable components (50, 56) which carry respective parts of a two-part, non-contact type switch arrangement.

10. A vehicle brake as claimed in claim 9 wherein one component (56) carries a magnet (58) and the other component (50) carries a Hall-effect sensor (52).

11. A vehicle brake as claimed in claim 10 wherein the two relatively rotatable components comprise a base frame (50), carrying the Hall-effect sensor (52), and an upper cover (56) carrying the magnet (58), the frame (50) and cover (56) being assembled through a boss (62) on or coupled to the caliper body such that the cover (56) can be selectively rotated about the frame (50).

12. A vehicle brake as claimed in claim 11 wherein the cover (56) is arranged to turn on the frame (50) such as to provide both rotational and linear movement therebetween.

13. A vehicle brake as claimed in claim 10, wherein the magnet (58) and sensor (52) are both disposed off-axis on the relatively rotatable components (50, 56), with the magnet (58) being substantially 180 degrees opposed to the sensor (52) in a rest/start position and wherein relative rotary movement by an amount at which a signal is to be generated brings the magnet (58) and sensor (52) into alignment.

14. A vehicle brake as claimed in claim 8 wherein the de-adjust signal is communicated to an actuation mechanism for increasing the distance between the brake lining and the brake rotor by retracting the brake lining away from the brake rotor to allow friction lining replacement.

15. A vehicle brake assembly comprising:

a rotor;

at least one friction pad spaced apart from said rotor and including a friction lining for engagement with said rotor;

a caliper body including an actuation mechanism for selectively moving said friction pad into contact with said rotor to brake the vehicle;

an electrical adjustor for maintaining a predetermined running clearance between said lining and said rotor in response to lining wear; and a switch for supplying a de-adjust signal, said switch being adapted to be mounted on or in said caliper body to provide a non-contact switch arrangement actuated by a rotary movement provided by a rotatable component of the brake in response to lining wear.

16. A brake assembly as claimed in claim 15, wherein said switch comprises two relatively rotatable components which carry respective parts of a two-part, non-contact switch arrangement.

17. A brake assembly as claimed in claim 16, wherein one of said rotatable components supports a magnet and the other of said rotatable components supports a Hall-effect sensor.

18. A brake assembly as claimed in claim 15 wherein said de-adjust signal is communicated to said actuation mechanism to retract said friction pad from said rotor once a predetermined minimum friction lining thickness has been achieved to allow friction lining replacement.

19. A brake assembly as claimed in claim 18 wherein said electric adjuster includes a motor for adjusting position of said friction lining relative to said rotor by moving said friction lining closer to said rotor to maintain said predetermined running clearance in response to lining wear and said motor for moving said friction lining away from said rotor to a lining replacement position in response to said de-adjust signal.

* * * * *